W. F. HUNT.
ELECTRIC LOCOMOTIVE.
APPLICATION FILED NOV. 21, 1907.

932,707.

Patented Aug. 31, 1909.

Attest:
W. F. McGinn
Thomas A Price

Inventor:
William F Hunt
by Redding, Kiddle & Greeley
Attys.

UNITED STATES PATENT OFFICE.

WILLIAM F. HUNT, OF NEW YORK, N. Y., ASSIGNOR TO C. W. HUNT COMPANY, OF NEW YORK, N. Y., A CORPORATION OF NEW YORK.

ELECTRIC LOCOMOTIVE.

932,707.  Specification of Letters Patent.  Patented Aug. 31, 1909.

Application filed November 21, 1907. Serial No. 403,130.

*To all whom it may concern:*

Be it known that I, WILLIAM F. HUNT, a citizen of the United States, residing in West New Brighton, in the borough of Richmond, of the city of New York, in the State of New York, have invented certain new and useful Improvements in Electric Locomotives, of which the following is a specification, reference being had to the accompanying drawings, forming a part hereof.

In large factory plants and elsewhere there are now frequently installed industrial railways. The locomotives for such railways are most conveniently driven by electricity and derive the supply of current from storage batteries mounted on the locomotives. Nevertheless, economy in operation is secured by supplying the current used on the longer stretches of track from a generator through conductors and trolleys. Not only may the motors be driven by the current supplied through the trolleys, thus reserving the storage batteries for use where the trolley wire cannot be used conveniently, but the storage batteries themselves may be recharged. At the same time, however, precaution must be taken lest the polarity of the connections be changed when the relation of the moving contacts to the conductors is changed, lest the storage batteries be discharged instead of receiving surplus current from the trolleys during driving of the motors from the trolleys.

The object of this invention is to provide means to guard against such reversal of polarity, the contacts carried by the locomotive, whether trolleys or shoes, being so combined and arranged that one of such contacts shall be always in contact with the positive wire and that one of two other contacts, connected in parallel, shall be always in contact with the negative wire.

The invention will be more fully explained hereinafter with reference to the accompanying drawings in which it is illustrated, and in which—

Figure 1:
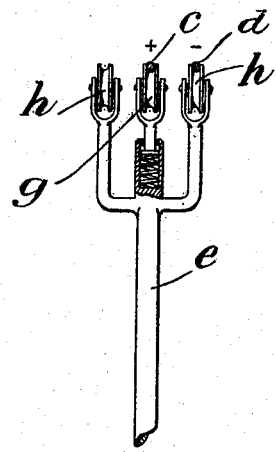
Figure 2:
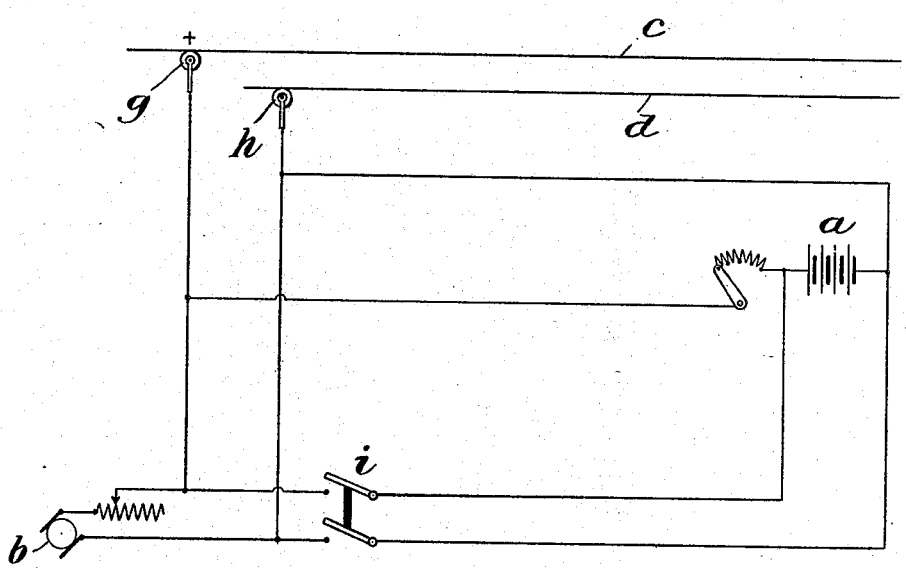

Figure 1 is a detail view of the contacts carried by the trolley arm of the locomotive. Fig. 2 is a diagrammatic view illustrating in simple form the electrical connections.

The electric locomotive to which the invention is applied may be of any suitable construction, provided with a storage battery $a$ and motors $b$ which may receive current from the storage battery through plural conductors, from a generator located at some convenient point. These plural conductors may be arranged as most convenient, being shown herein as two trolley wires $c$ and $d$, the one positive and the other negative, above the track and in the same horizontal plane. The locomotive is therefore equipped with a trolley arm $e$ supported in any convenient manner. Obviously, if the trolley arm $e$ should be provided with but two contacts, arranged as usual with reference to two overhead conductors in a horizontal plane, the polarity of the connections to the battery and motors would be reversed whenever the trolley arm is swung from one trailing position to the other. In the embodiment of the invention shown there is provided a trolley or contact $g$ which is connected, as shown in Fig. 2, to the positive side of the motor $b$ and the positive side of the battery $a$, and two trolleys or contacts $h\ h$ which are connected in parallel to the negative side of the motor and of the battery, as also indicated in Fig. 2. Accordingly, whether the trolley arm be in one position or the other, or the relation of the main circuit wires or leads on the locomotive to the conductors be otherwise changed, there will always be a trolley or contact available for contact with the negative conductor, the trolley or contact $g$ being always in contact with the positive conductor $c$. The battery, therefore, instead of being discharged on the line by a reversal of polarity of the connections, will be charged from the line by such current as is not used in the motors. Suitable switch devices are of course provided for operation of the motors from the trolley or from the battery, as indicated in simple form at $i$ in Fig. 2.

It will be understood that the arrangement of contacts will be suited to the conditions of operation, there being in each instance one contact for one of the conductors and two contacts in parallel, either one of which may contact with the other conductor according to the relation of the main leads on the locomotive to the conductors and thus preserve the polarity of the connections.

I claim as my invention:

1. The combination with an electric locomotive and its motors, of a storage battery carried by the locomotive, plural conductors external to the locomotive, a contact carried by the locomotive for one of said conductors and two contacts in parallel carried by the locomotive and adapted for contact, the one or the other, according to the relation of the main leads on the locomotive to the conductors, with the other conductor, and connections between said contacts, battery and motors.

2. The combination with an electric locomotive and its motors, of a storage battery carried by the locomotive, plural conductors external to the locomotive, a three armed trolley carried by the locomotive, a contact on said trolley connected to one side of the battery and motors, two contacts carried by said trolley and connected in parallel to the other side of said battery and motor, and connections between the battery and the motors.

3. In an electric locomotive, an electric motor adapted to propel said locomotive; a storage battery carried by said locomotive; two conductors external to said locomotive; a trolley carried by said locomotive and provided with a single contact adapted to engage one of said conductors and with two other contacts connected in parallel either one of which may engage the other of said conductors, to thereby convey a current of electricity to said locomotive; electrical connections upon said locomotive whereby said motor and said battery are connected in parallel to thereby simultaneously receive current from said external conductors; electrical connections upon said locomotive whereby said motor may be operated by current from said battery; and a switch for controlling said last mentioned connections.

4. In an electric locomotive, an electric motor adapted to propel said locomotive; a storage battery carried by said locomotive; electrical connections upon said locomotive whereby said motor and said battery are connected in parallel to thereby simultaneously receive current from a source external to said locomotive; electrical connections upon said locomotive whereby said motor may be operated by current from said storage battery; a switch for controlling said last mentioned connections; a plurality of conductors external to said locomotive; and a plurality of contacts carried by said locomotive and adapted to contact with said conductors to thereby convey a current of electricity to said motor and said battery; the arrangement of said contacts being such that the direction of the flow of current through said motor and battery will be maintained irrespective of the direction of movement of said locomotive.

This specification signed and witnessed this 17th day of November, A. D. 1907.

WM. F. HUNT.

Signed in the presence of—
ELLA J. KRUGER,
AGNES L. O'REILLY.